United States Patent
Crisan et al.

(10) Patent No.: US 7,376,944 B2
(45) Date of Patent: May 20, 2008

(54) HARDWARE ROM UPGRADE THROUGH AN INTERNET OR INTRANET SERVICE

(75) Inventors: Adrian Crisan, Cypress, TX (US); David Burckhartt, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 455 days.

(21) Appl. No.: 10/029,766

(22) Filed: Dec. 18, 2001

(65) Prior Publication Data

US 2003/0172372 A1 Sep. 11, 2003

(51) Int. Cl.
  G06F 9/44 (2006.01)
  G06F 11/00 (2006.01)
  G06F 15/177 (2006.01)
(52) U.S. Cl. .................... 717/171; 714/36; 713/2; 713/100
(58) Field of Classification Search .......... 717/178, 717/173, 171; 714/36
See application file for complete search history.

(56) References Cited

U.S. PATENT DOCUMENTS

| | | | | |
|---|---|---|---|---|
| 6,009,524 A | * | 12/1999 | Olarig et al. | 713/200 |
| 6,502,240 B1 | * | 12/2002 | Naclerio | 717/170 |
| 6,516,346 B1 | * | 2/2003 | Asco et al. | 709/221 |
| 6,594,757 B1 | * | 7/2003 | Martinez | 713/2 |
| 6,742,025 B2 | * | 5/2004 | Jennery et al. | 709/220 |
| 7,080,134 B2 | * | 7/2006 | Doherty et al. | 709/221 |
| 2001/0007131 A1 | * | 7/2001 | Galasso et al. | 713/187 |
| 2002/0073304 A1 | * | 6/2002 | Marsh et al. | 713/1 |
| 2002/0188934 A1 | * | 12/2002 | Griffioen et al. | 717/170 |
| 2003/0110369 A1 | * | 6/2003 | Fish et al. | 713/1 |

* cited by examiner

Primary Examiner—Eric B. Kiss

(57) ABSTRACT

An on-line service is automatically accessed by the computer as it boots up to determine if a ROM update exists for the system. If so, the updated ROM code is downloaded to the system and the ROM is flashed. The operator of the system is generally uninvolved in this process and the process is preferably performed each time the system initializes. In this manner, the system's ROM is nearly always up to date proactively and the operator or IT administrator need not spend time and energy reacting to a problem, determining whether a ROM update exists, finding the updated ROM, downloading the new ROM code and flashing the ROM him or herself.

18 Claims, 3 Drawing Sheets

HARDWARE ROM UPGRADE THROUGH AN INTERNET OR INTRANET SERVICE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to flashing a ROM and more particularly to flashing a ROM with reduced user involvement. Still more particularly, the invention relates to upgrading a ROM from an on-line service during the boot process.

2. Background Information

Computer systems include numerous electrical components that perform various functions. Computers include a central processing unit ("CPU"), memory, input/output devices and various other logic and devices all coupled together according to a system architecture. One of the types of components contained within most, if not all, computers is a read only memory ("ROM") device. A ROM device has the characteristic that the information it contains is not erased when the computer is turned off. This is in contrast to a random access memory ("RAM") device (e.g., main system RAM) for which the contents are lost when power is removed.

ROMs can be used for a variety of purposes and often there is more than one ROM device contained in the computer. One ROM device that is commonly found in most computers is referred to as the "system ROM." The system ROM contains code that is executed by computer's CPU to perform a number of low-level functions. This code is generally referred to as the basic input/output system ("BIOS") code. For example, the BIOS code executes the power on self test ("POST") during system initialization ("boot up"). The POST routines test various subsystems in the computer system, isolate faults and report problems to the user. The BIOS code also is responsible for loading the operating system into the computer's main system memory. Further, the BIOS code handles the low-level input/output transactions to the various peripheral devices such as the hard disk drive and floppy drives. It should be understood that the BIOS code is stored in the ROM and copied to the main RAM memory for execution therefrom during runtime.

Early on, ROM devices were programmed at the factory and could not be reprogrammed by the operator of the computer. If updated BIOS code became available, the operator would either have to live without the update or replace the physical ROM device itself. Since then, it has become possible for operators (even home users) to cause the BIOS ROM to be reprogrammed without removing it from the computer. Reprogramming the ROM is often referred to as "flashing" the ROM. Typically, the process of flashing the ROM involved placing a floppy disk containing the new BIOS code in the floppy disk drive of the computer and executing flash code also stored on the floppy disk. The flash code caused the new BIOS code from the floppy disk to overwrite the older version of the BIOS on the ROM. This process is generally satisfactory, but does require involvement from the operator who may have no technical background or interest in being involved in the ROM flashing process. Also, this process can be very time consuming particularly for enterprises that have dozens, hundreds or thousands of computers.

Today, most ROM updates are reactive which means that the ROM is updated after a problem or other issue has arisen. The ROM is flashed with updated BIOS to resolve the issue or problem. In general, this requires the operator or Information Technology ("IT") administrator in an enterprise to know that a ROM update exists for their system which in turn requires telephone calls or on-line research to find out if a ROM update exists—a time consuming and bothersome task. Once it is known that the ROM update exists, the ROM can then be flashed as explained above or via other mechanisms such as via remote booting or through operating system dependent tools.

Moreover, getting to the point where one knows that the BIOS ROM needs to be flashed, finding a ROM update and flashing the ROM with the update is a cumbersome, time consuming and, for many, a difficult task. Accordingly, there is a need to provide a better mechanism in the art of ROM updating.

BRIEF SUMMARY OF THE PREFERRED EMBODIMENTS OF THE INVENTION

The problems noted above are solved in large part by a process whereby a computer can have its ROM updated during initialization. An on-line service is automatically accessed by the computer as it boots up to determine if a ROM update exists for the system. If so, the updated ROM code is downloaded to the system and the ROM is flashed. The operator of the system is generally uninvolved in this process and the process is preferably performed each time the system initializes (e.g., during "boot"). In this manner, the system's ROM is nearly always up to date proactively and the operator or IT administrator need not spend time and energy reacting to a problem, determining whether a ROM update exists, finding the updated ROM, downloading the new ROM code and flashing the ROM him or herself.

In accordance with one embodiment, one or more client computers couple to a ROM server through the Internet, an intranet or any other type of network. During boot up, a client sends a request to the ROM server to determine if an updated ROM image exists. If so, the image is downloaded to the client and the client reflashes its ROM with the updated image. The actual ROM image may be contained within a database associated with the ROM server or the database may simply contain links (e.g., URLs) to locations where the updated ROM images can be found. In accordance with another embodiment, a proxy enterprise ROM server is used to first test an upgraded ROM before letting its clients update their ROMs through the enterprise's network.

There are a variety of techniques of establishing communication with the ROM server. For example, the client's ROM can be programmed with an IP address or URL to go to a specific ROM server. Further, an IT department can program the ROMs to point to the proxy server within their firewall. Additionally, the ROM can broadcast a message that requests an available ROM server to identify itself. An available ROM server will then respond with its IP address or URL for the web service interface. Additionally, a web service redirector server can be used which looks at additional information (such as an Asset or Ownership tag for the client and which is sent in the request packet). Based on this information, the redirector server may redirect the request back within the enterprise to the appropriate intranet enterprise proxy server.

The preferred embodiments of the invention permit a client computer nearly always to have its ROM up to date, if desired, without any involvement by the operator. This alleviates the burden from having to react to problems by figuring out whether an updated ROM version exists and obtaining that ROM image.

These and other advantages will become apparent upon reviewing the following disclosure.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical connection. Thus, if a first device couples to a second device, that connection may be through a direct electrical connection, or through an indirect electrical connection via other devices and connections. To the extent that any term is not specially defined in this specification, the intent is that the term is to be given its plain and ordinary meaning.

DETAILED DESCRIPTION OF THE PREFERRED EMBODIMENTS

In accordance with the preferred embodiment of the invention, an electronic system, such as a computer, containing a reprogrammable read only memory ("ROM") is updated preferably during system initialization. During boot, an on-line service is automatically accessed to determine if a ROM update exists for the system. If so, the updated ROM code is downloaded to the system and the ROM is flashed. The operator of the system is generally uninvolved in this process and the process is preferably performed each time the system initializes. In this manner, the system's ROM is nearly always up to date proactively and the operator or IT administrator need not spend time and energy reacting to a problem, determining whether a ROM update exists, finding the updated ROM, downloading the new ROM code and flashing the ROM him or herself.

Figure 1:
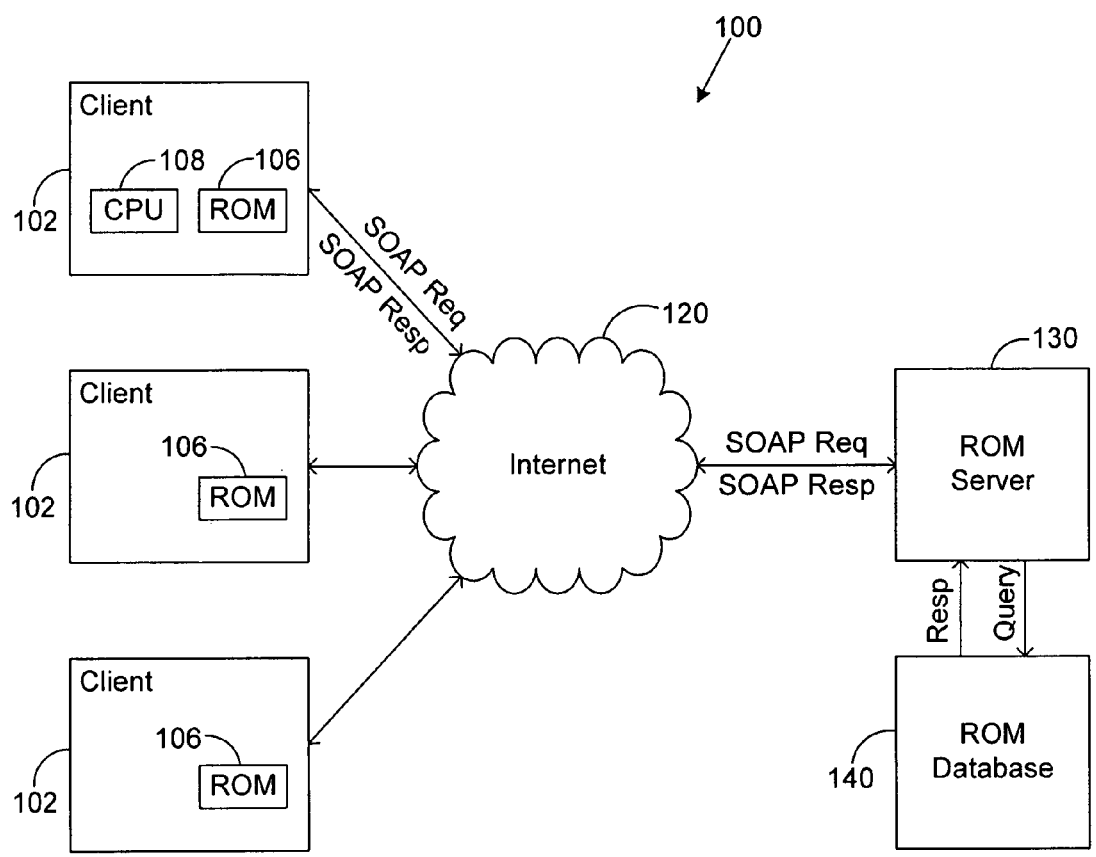
FIG. 1 shows an architecture in accordance with the preferred embodiment by which a client system can upgrade its ROM during the boot process via an on-line mechanism.

There are numerous embodiments of this process. One such embodiment is shown in FIG. 1. Referring now to FIG. 1, system 100 includes one or more clients 102 in communication with an on-line ROM server 130 through a network connection 120 which may comprise the Internet or other suitable network. The ROM server 130 includes or has access to a ROM database 140. The clients 102 are any type of electronic system that has at least one ROM device 106. ROM 106 may comprise the BIOS ROM or an option ROM such as may be found on an add-in card. Clients 102 preferably may be personal computers or servers and have commonly known components such as a processor 108 and RAM memory (not shown), as well as the ROM 106. The clients may or may not be desktop or portable computers and accordingly may include handheld devices, tablet PCs, telephones, etc. The clients 102 may or may not be related to each other. That is, the clients 102 may simply be disparate computers that all have a need or desire for ROM updates. Alternatively, the clients 102 may be computers within a single enterprise. Further, the clients 102 are some combination of related or unrelated computers.

The ROM server 130 comprises one or more servers that is accessible to the clients 102 via the Internet 120. The ROM server 130 performs much of the logic described below. The ROM database 140 may include one or more ROM "images." An image is an executable program that can be programmed into a ROM 106 for subsequent execution by a CPU (not specifically shown) in the client. Alternatively, the ROM database 140 may not include actual ROM images, but rather include IP addresses URLs to other locations (not shown) on the Internet where the ROM images may be stored.

Figure 2:
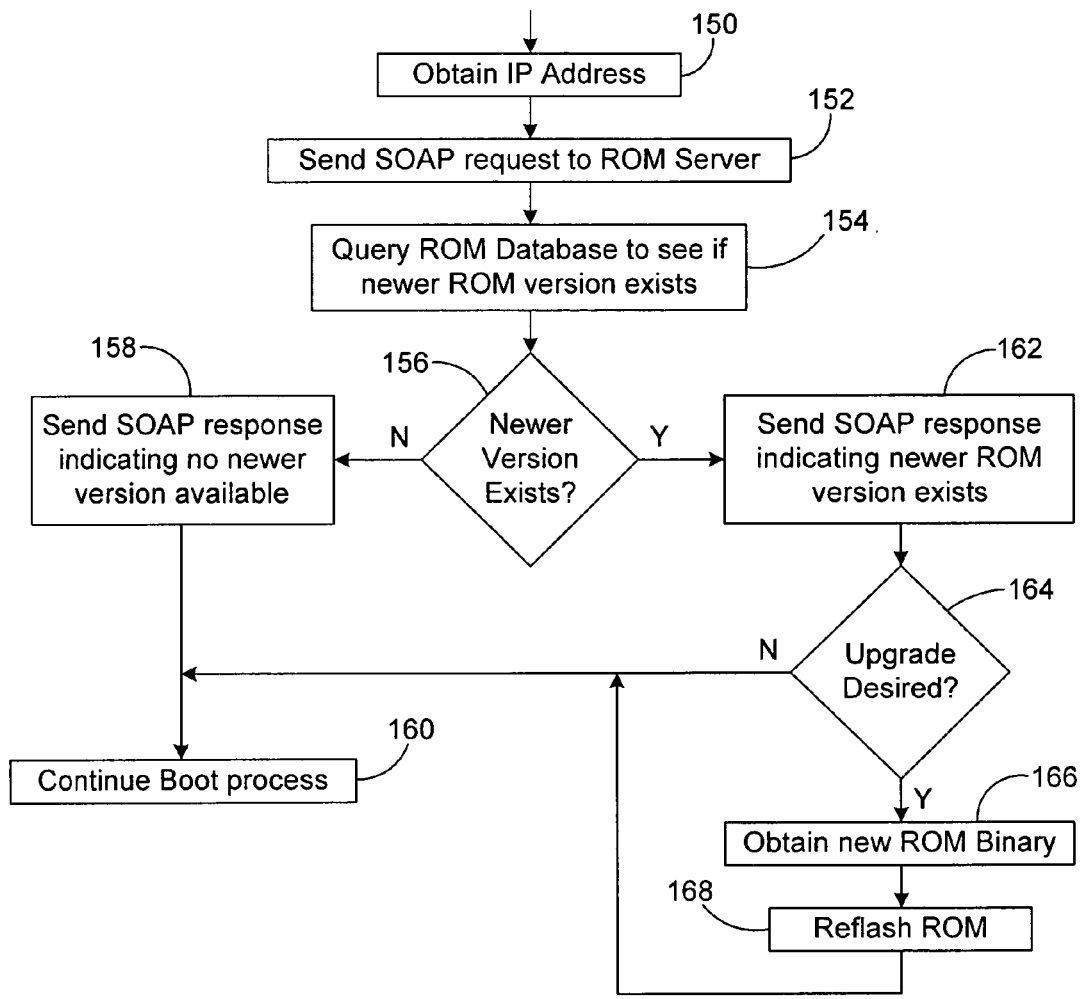
FIG. 2 shows a method of upgrading a ROM using the architecture of FIG. 1.

The operation of the preferred embodiment in FIG. 1 will now be described with reference to the logic flow chart of FIG. 2. The flow chart includes steps 150-168. These steps preferably are performed for each client individually and preferably while the client is initializing. In step 150, the client 102 obtains an Internet Protocol ("IP") address in accordance with conventional techniques such as through the well known on-line DHCP service.

In step 152, the client 102 sends a request through the Internet 120 to the ROM server 130. The request asks the ROM server to find out whether an updated version of the client's ROM code is available. The request can be in accordance with any format. One suitable format is for the request to comprise a Simple Object Access Protocol ("SOAP") message. SOAP messages are well known in the art and generally comprise a text Extended Markup Language ("XML") message The SOAP request message transmitted by the client 102 preferably includes one or more values that the ROM server 130 uses to determine if an updated ROM image is available. Those values may include the class or type of ROM and ROM image currently in the client and the current version of the client's ROM image. Additional information that can be sent in the SOAP message may be the asset tag, ownership tag, system's serial number, system type, language of the ROM strings for the ROM user interface, etc. Encryption information may also be included in the SOAP request in the event that it is desired to encrypt or digitally sign the ROM image. For example, the SOAP request could include a public key associated with the client that the ROM server 130 uses to sign a ROM image transferred back to the client. The client 102 could use its private key to verify the authenticity of the ROM image signed with the associated public key. In this way, the client 102 has increased assurance that the new ROM image is from a trusted source and is authentic.

After receiving the SOAP request from the client 102, the ROM server 130 queries the ROM database 140 to determine if an updated ROM image exists. Having the version of the client's current ROM image, the ROM server can determine if a more recent ROM image exists that is suitable for the client. If no newer version exists of the client's ROM image (as determined by the ROM server in step 156), then in step 158, the ROM server sends a SOAP formatted response message back to the client indicating that no new version is available. In this case the ROM is not reflashed and the boot process continues in step 160.

If, however, a newer version of the client's ROM image exists, then in step 162, a SOAP response is transmitted to the client so indicating. In step 164, the operator of the client system can be prompted, if desired, to authorize an update to the ROM. This authorization may be implemented simply by displaying a question on the client's display (not specifically shown) indicating that a newer version of the ROM image is available and asking the operator whether he or she wishes the ROM to be reflashed. Further, notification of the ROM update also could include an indication of the severity of problems resolved and additional information needed to decide whether or not to apply the upgrade (e.g., whether the upgrade is mandatory to retain the manufacturer's warranty, or resolves a specific problem along with a description of the specific problem). If the operator does not wish the ROM to be reflashed, then the ROM is not reflashed and the boot process continues in step 160. If the operator does wish for the ROM to be reflashed, then the client obtains the new ROM image in step 166 and uses that image to flash the ROM in step 168. Alternatively, the system need not prompt the user for authorization to flash the ROM. Rather, the client system could automatically proceed with flashing the ROM without the client's authorization. This could be a system configuration option wherein the user makes a one-time selection to accept all future upgrades. After flashing, the boot process then continues in 160, after which the client's operating system is loaded. This means that the ROM is reflashed without use of the operating system.

The new ROM image may be provided as part of or appended to the SOAP response message from the ROM server. This process downloads the ROM image from the ROM sever 130 directly to the client, but may be time consuming, particularly, if the user decides not to update the ROM image. Alternatively, as explained above, the SOAP response message may simply include a pointer (e.g., URL, IP address, etc.) to a location on the network 130 where the updated ROM image can be found. In this case, if the operator wishes the update, then the client uses the pointer to go out and retrieve the desired ROM image. An advantage to this process is that ROM images are not downloaded to the client unless the client wishes its ROM to be updated, and thus time is not spent downloading unused ROM images. In this embodiment, the initial response message from the ROM server may include not only the URL for the new image, but also identifying information about the new image (e.g., version number, class, etc.). The client uses this identifying information when obtaining the ROM image from another location on the Internet.

Once the client 102 has the updated ROM image to be flashed, the client system 102 performs a self-flash of its ROM 106. Flashing the ROM can be performed in accordance with any known or later developed methods. One such method is described in U.S. Pat. No. 6,243,809, incorporated herein by reference.

Figure 3:
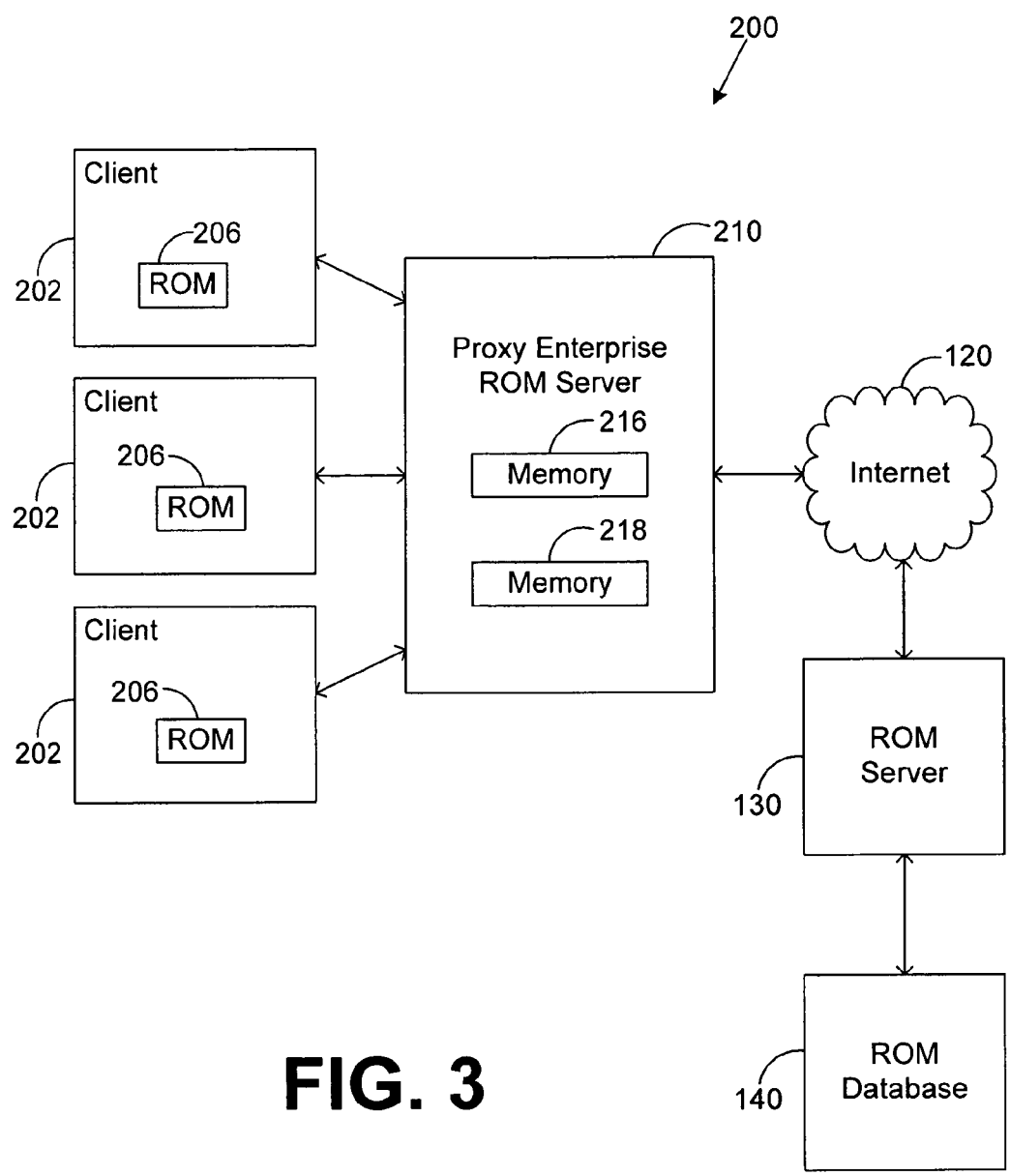
FIG. 3 shows an alternative embodiment to FIG. 1 using a proxy enterprise server.

FIG. 3 shows a configuration 200 which represents an alternative embodiment to that of FIG. 1. Configuration 200 includes one or more clients 202, each having a programmable ROM 206, coupled to a proxy enterprise ROM server 210. The proxy enterprise ROM server 210 couples to the ROM server 130 and ROM database 140 via the Internet 120. In some ways, the system of FIG. 3 works the same as was described above with regard to FIG. 1. A difference is as follows: All clients in the Enterprise preferably send SOAP messages with information to proxy server 210. The proxy server thus can keep track of the client systems that are available in the Enterprise. Because the server 210 knows what systems exist in the Enterprise, the server can ask the ROM server 130 for the availability of ROM updates for those systems. If ROM updates exist, the proxy server 210 downloads the new ROMs in a temporary area of memory 218 and alerts the IT administrator that new ROMs for specific systems are available. The IT administrator then would take the ROM, place it in a test environment and run ROM suitable "approval" tests on the ROM. If the ROM passes the tests and is "approved", then the administrator marks the ROM as approved on the server and the server moves the ROM from the temporary area 218 into the ROM distribution memory area 216. Clients that check for ROM updates preferably only check against the ROM distribution area 216 which contains only "approved" ROMs. This feature may be particularly useful for an enterprise that wishes to ensure that a ROM update will not detrimentally interfere with any of its current software.

Then, during the boot up process for a client 202, the client sends a request to the proxy enterprise ROM server 210 to find out if an updated version of the client's ROM exists. The proxy enterprise ROM server 210 knows the current ROM version of each of its clients. If no updated ROM image exists, then the client's ROM is not flashed and the boot process completes. If the proxy enterprise ROM server 210 determines that it has available an updated and approved version of the client's ROM image in memory area 218, the proxy enterprise ROM server transmits that ROM image to the client which then reflashes its ROM 206. In this scenario, the IT administrator can make the decision for the end user and override the user selection/decision process, or alternatively, the system can allow the IT administrator to inject instructions to the user to aid in the user decision process (e.g., "Accept this upgrade if you have a local printer.").

There several advantages to the embodiments described above. The advantages include any one or more of the following:

- Users do not have to find out reactively that a new ROM image is required before they can upgrade the operating system or to resolve some other problem they have. As soon as the ROM is available, the users will have it installed on their systems without their assistance (unless authorization for the upgrade is implemented as in step 164).
- The ROM upgrade is simple and painless. There is no need to create an infrastructure or to create floppy disks.
- The ROM upgrade takes place as soon as a new ROM is released. This significantly reduces the number of support calls that are generated because the user is using the old ROM.
- The ROM upgrades are operating system agnostic. The advantage of this is the fact that remote ROM upgrades for non-Windows operating systems are not enabled. If a new operating system requires a new ROM, the user does not have to call a support service to find that out after trying to install the ROM.
- The ROM upgrade process described herein can be used by home users or by enterprise organizations by setting up their own remote update servers.

The ROM web service can be used to configure ROM settings remotely as well as to perform other pre-operating system activities that need to be implemented. Examples of settings would be things like remotely disabling all floppy disks on computers that have a specific asset or ownership tag. This would be useful in task oriented environment such as a factory floor. Basically, any F10 ROM setting could be configurable in this way. One of the responses from the ROM web service could be "I don't have a new ROM but you need to change your ROM settings to be . . . "

The above discussion is meant to be illustrative of the principles and various embodiments of the present invention. Numerous variations and modifications will become apparent to those skilled in the art once the above disclosure is fully appreciated. For example, the particular circuit implementations shown in the figures may be modified in a number of different ways without departing from the principles and scope of this disclosure. Components can be added or removed from the circuits and different circuits altogether that provide the same benefits and functionality can be used. It is intended that the following claims be interpreted to embrace all such variations and modifications.

What is claimed is:

1. A computer system, comprising:
   a central processor unit (CPU);
   a programmable read only memory (ROM) coupled to said CPU, said ROM containing a digital image;
   wherein said CPU programs its ROM during a single system initialization by the CPU, wherein the single system initialization further comprises a booting of said system;
   a connection to a network and wherein, during the single system initialization, said system sends a message to a server coupled to the network to determine whether an upgraded image is available for said ROM; and
   wherein, during the single system initialization, said system receives an upgraded image and flashes said ROM with the upgraded image before loading any portion of the operating system in a random access memory associated with the CPU if the upgraded image is available for said ROM.

2. The system of claim 1 wherein said system receives the upgraded image from said server.

3. The system of claim 1 wherein said system receives a link to another server which provides the upgraded image.

4. The system of claim 1 wherein said message includes an indication of the version of the ROM's current image.

5. The system of claim 1 wherein said message includes an indication of the class of the ROM.

6. The system of claim 1 wherein said message includes an encryption key to be used to help assure the authenticity of the image.

7. The computer system of claim 1, wherein the system sends the message to the server coupled to the network to determine whether the upgraded image is available for said ROM upon each occurrence of the single system initialization.

8. A method of upgrading an image on a ROM, comprising:
   performing a single system initialization of a system containing the ROM, wherein the single system initialization further comprises a booting of the system where the system further comprises a central processing unit (CPU);
   while performing said single system initialization, transmitting a message to a server to determine whether an upgraded image exists for the ROM; and
   receiving an upgraded image and flashing the ROM during said single system initialization before loading any portion of the operating system in a random access memory associated with the CPU.

9. The method of claim 8 further including, during the single system initialization, receiving the upgraded image from said server.

10. The method of claim 8 further including, during the single system initialization, receiving a link from said server, said link pointing to another server that contains said upgraded image.

11. The method of claim 8 wherein said message includes an indication of the version of the ROM's current image.

12. The method of claim 8 wherein said message includes an encryption key to be used to help assure the authenticity of the image.

13. The method of claim 8 wherein said message includes an indication of class of the ROM.

14. A ROM image system, comprising:
   a server;
   a database accessible by said server, said database storing information regarding ROM images; and
   wherein said server receives a message from a computer that is currently undergoing a single system initialization to determine if an upgrade exists for the computer's ROM image, uses said information to determine if an upgrade is available for the computer's ROM image and transmits a response to the computer indicating whether an upgrade is available during the single system initialization of the computer, wherein said response includes an upgraded ROM image, and wherein the upgraded ROM image is installed during the single system initialization of the computer before loading any portion of the operating system in a random access memory associated with the computer.

15. The system of claim 14 wherein said response includes a pointer to where an upgraded image is located.

16. The system of claim 15 wherein said pointer includes a URL.

17. The system of claim 15 wherein said pointer includes an IP address.

18. An enterprise computing system, comprising:
   a plurality of computers, each having a programmable ROM;
   a proxy enterprise ROM server to which the computers couple, said proxy enterprise ROM server communicating with a network external to the enterprise; and
   wherein said proxy enterprise ROM server includes a first storage area for an untested ROM image update, and a second storage area for an approved ROM image update, and at least one of said computers, during its single initialization and before loading any portion of an operating system in a random access memory associated with the at least one of said computers, checks the second storage area for the approved ROM image update to be installed in the at least one of said computers, wherein the approved ROM image update comprises the untested ROM image update that has undergone at least one suitable approval test.

* * * * *

UNITED STATES PATENT AND TRADEMARK OFFICE
CERTIFICATE OF CORRECTION

PATENT NO. : 7,376,944 B2 Page 1 of 1
APPLICATION NO. : 10/029766
DATED : May 20, 2008
INVENTOR(S) : Adrian Crisan et al.

It is certified that error appears in the above-identified patent and that said Letters Patent is hereby corrected as shown below:

In column 4, line 26, after "addresses" insert -- or --.

Signed and Sealed this

Second Day of September, 2008

JON W. DUDAS
*Director of the United States Patent and Trademark Office*